(12) United States Patent
Suh

(10) Patent No.: US 7,700,216 B2
(45) Date of Patent: Apr. 20, 2010

(54) STACK FOR FUEL CELL SYSTEM HAVING AN ELEMENT FOR REDUCING STRESS CONCENTRATION

(75) Inventor: Dong-Myung Suh, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 663 days.

(21) Appl. No.: 11/408,819

(22) Filed: Apr. 20, 2006

(65) Prior Publication Data

US 2006/0240307 A1 Oct. 26, 2006

(30) Foreign Application Priority Data

Apr. 20, 2005 (KR) .................. 10-2005-0032692

(51) Int. Cl.
*H01M 2/08* (2006.01)
*H01M 2/02* (2006.01)
(52) U.S. Cl. .............................. 429/37; 429/35; 429/34
(58) Field of Classification Search ........................ None
See application file for complete search history.

(56) References Cited

U.S. PATENT DOCUMENTS

| | | | | |
|---|---|---|---|---|
| 4,073,329 | A * | 2/1978 | Hala | 411/275 |
| 5,009,968 | A * | 4/1991 | Guthrie et al. | 429/26 |
| 6,190,793 | B1 * | 2/2001 | Barton et al. | 429/34 |
| 6,495,280 | B2 * | 12/2002 | Morrow et al. | 429/35 |

FOREIGN PATENT DOCUMENTS

| | | |
|---|---|---|
| JP | 48-053230 | 7/1973 |
| JP | 52-002073 | 1/1977 |
| JP | 57-134415 | 8/1982 |
| JP | 57-163678 | 10/1982 |
| JP | 57-163678 U * | 10/1982 |
| JP | 58197679 A * | 11/1983 |

(Continued)

OTHER PUBLICATIONS

Patent Abstracts of Japan, Publication No. 05-225997; Date of Publication: Sep. 3, 1993; in the name of Minoru Hosaka.

(Continued)

*Primary Examiner*—Dah-Wei D Yuan
*Assistant Examiner*—Edu E Enin-Okut
(74) *Attorney, Agent, or Firm*—Christie, Parker & Hale, LLP

(57) ABSTRACT

A stack for a fuel cell system includes an electricity generating unit, end plates, a restraint portion, and an element for reducing stress. The electricity generating includes a membrane-electrode assembly (MEA) and separators respectively disposed on opposite surfaces of the MEA. The end plates are respectively disposed at opposite sides of the electricity generating unit. The restraint portion is joined with the end plates to fasten the end plates and the electricity generating unit together. The restraint portion includes a restraint rod which is disposed in the end plates, and a nut which is screw-joined with the restraint rod so that the restraint rod is fastened to the end plates. The element for reducing stress concentration is coupled to each of the end plates to reduce (or minimize or prevent) a stress force generated by the nut from concentrating at a portion where the restraint portion is disposed.

16 Claims, 4 Drawing Sheets

FOREIGN PATENT DOCUMENTS

| | | |
|---|---|---|
| JP | 59-099106 | 6/1984 |
| JP | 60-225370 | 9/1985 |
| JP | 62-271364 | 11/1987 |
| JP | 01-116213 | 8/1989 |
| JP | 01-173516 | 12/1989 |
| JP | 02-113011 | 9/1990 |
| JP | 5-225997 | 9/1993 |
| JP | 05225997 A * | 9/1993 |
| JP | 07-029359 | 6/1995 |
| JP | 09-259916 | 10/1997 |
| JP | 2002-302785 | 10/2002 |
| JP | 2002-343410 | 11/2002 |
| JP | 2003-338306 | 11/2003 |
| JP | 2004-179057 | 6/2004 |
| JP | 2004-349052 | 12/2004 |
| JP | 2005-251667 | 9/2005 |
| JP | 2006-156164 | 6/2006 |
| JP | 2006-179402 | 7/2006 |
| KR | 2003-0022723 | 3/2003 |
| KR | 10-2004-0003348 | 1/2004 |
| KR | 10-2005-0036394 | 4/2005 |

OTHER PUBLICATIONS

Patent Abstracts of Japan, Publication No. 2002-343410; Date of Publication: Nov. 29, 2002; in the name of Yutaka Hotta.

Korean Patent Abstracts, Publication No. 10-2005-0036394; Date of Publication: Apr. 20, 2005; in the name of Byung Sun Hong, et al.

Korean Patent Abstracts, Publication No. 1020030022723 A, dated Mar. 17, 2003, in the name of Nobuhiro Hase et al.

Korean Patent Abstracts, Publication No. 1020040003348 A, dated Jan. 13, 2004, in the name of Seung Tae Ko.

* cited by examiner

STACK FOR FUEL CELL SYSTEM HAVING AN ELEMENT FOR REDUCING STRESS CONCENTRATION

CROSS-REFERENCES TO RELATED APPLICATION

This application claims priority to and the benefit of Korean Patent Application No. 10-2005-0032692, filed in the Korean Intellectual Property Office on Apr. 20, 2005, the entire content of which is incorporated herein by reference.

BACKGROUND OF THE INVENTION (a) Field of the Invention

The present invention relates to a fuel cell system, and more particularly, to a stack for a fuel cell system.

(b) Description of the Related Art

As is well known, a fuel cell is an electricity generating system for directly converting chemical reaction energy into electric energy through an electrochemical reaction between hydrogen contained in hydrocarbon materials (e.g., methanol, ethanol, etc.) and oxygen or air containing oxygen.

The fuel cell that uses hydrogen generated by reforming methanol, ethanol, etc. as a fuel has a wide range of applications including as mobile power sources for vehicles, distributed power sources for homes or buildings, and small-sized power sources for electronic apparatuses.

The fuel cell described above has a structure in which a unit cell (or cell unit) includes a membrane-electrode assembly (MEA) for generating electricity by oxidation/reduction reaction between hydrogen and oxygen, and separators (or bipolar plates) that are respectively disposed on opposite surfaces of the MEA to supply hydrogen and oxygen to the MEA. A stack includes a plurality of unit cells.

The stack is composed of an additional pressing plate in contact with an outermost unit cell on either side of the stack, and may have a construction in which the unit cells are fastened by joining a restraint element of the pressing plate using a restraint rod and a nut.

Conventionally, when the pressing plate is joined to assemble the stack by using the restraint rod and the nut, there has been a problem in that a stress force is concentrated only at a portion of the pressing plate where the nut comes in contact with the pressing plate. This is because the pressing plate is deformed by a force generated when the nut is joined with a screw thread formed at the restraint rod, and the nut is then squeezed (or pressed) by the pressing plate, and thus the entire surface of the nut comes in contact with the pressing plate only in a particular surface portion of the pressing plate rather than coming in contact therewith in a uniform manner.

Accordingly, a restraint force of the restraint element of the pressing plate is weakened, and thus the stack becomes less resilient.

In particular, the aforementioned problems become more apparent when the thickness of the pressing plate of the stack is equal to or less than 2 mm.

SUMMARY OF THE INVENTION

An aspect of the present invention provides a stack for a fuel cell that can reduce (or minimize or prevent) elements of the stack from being deformed during a manufacturing process.

An embodiment of the present invention provides a stack for a fuel cell system including: an electricity generating unit having a membrane-electrode assembly (MEA) and a separator disposed on either surface of the MEA; an end (or pressing) plate disposed at either side of the electricity generating unit; a restraint portion joined with the end plate to fasten the end plate and the electricity generating unit together, wherein the restraint portion includes a restraint rod disposed into the end plate and a nut screw-joined with the restraint rod so that the restraint rod is fastened to the end plate; and an element for reducing stress concentration coupled to the end plate to reduce a stress force generated by the nut from concentrating at a portion where the restraint portion is disposed.

In one embodiment, the element for reducing stress concentration is disposed between the nut and the end plate, and a contact surface where the element for reducing stress concentration comes in contact with the nut is inclined.

In one embodiment, a thickness of the element for reducing stress concentration increases along a direction pointing from inside of the end plate to outside of the end plate to incline the contact surface where the element for reducing stress concentration comes in contact with the nut.

In one embodiment, the element for reducing stress concentration has a washer shape.

In one embodiment, the element for reducing stress concentration is integrated into the end plate.

In one embodiment, the contact surface of the element for reducing stress concentration and the nut is perpendicular with respect to a longitudinal direction of the restraint rod when the nut is screw-joined with the restraint rod.

In one embodiment, the thickness of the element for reducing stress concentration is equal to or less than 2 mm.

In one embodiment, the restraint rod is placed in an inserting hole formed at a corner of the end plate.

In one embodiment, a portion of the end plate proximate to where the restraint rod and the nut are screw-joined with each other is partially bent toward the electricity generating unit when the nut is screw-joined with the restraint rod.

In one embodiment, the element for reducing stress concentration causes a portion of the end plate proximate to where the restraint rod and the nut are screw-joined with each other to partially bend toward the electricity generating unit when the nut is screw-joined with the restraint rod.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
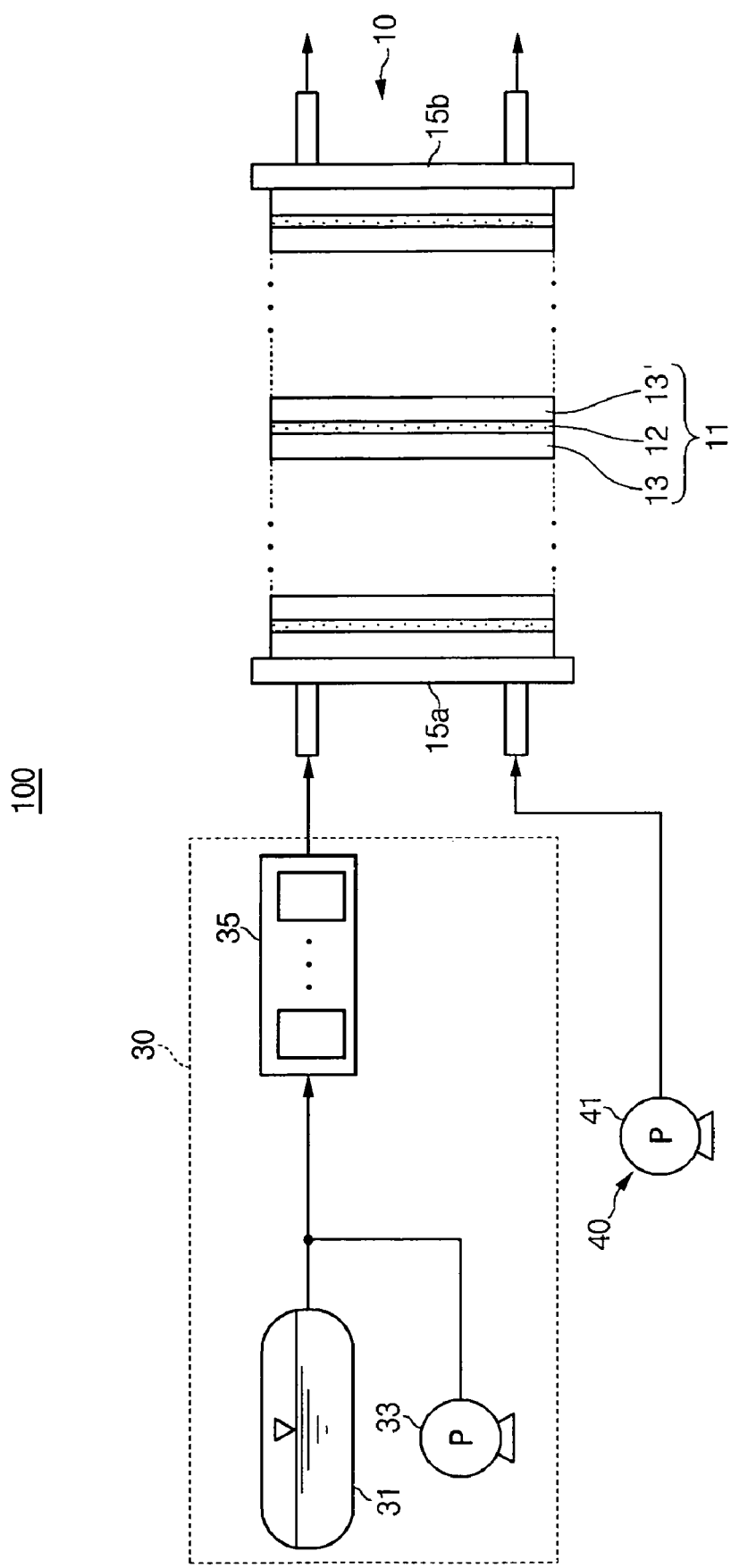
FIG. 1 is a schematic diagram illustrating a fuel cell system according to an embodiment of the present invention.

Referring to FIG. 1, a fuel cell system 100 is a polymer electrolyte membrane fuel cell (PEMFC) system in which hydrogen is generated by reforming a fuel containing hydrogen, and electric energy is generated by electrochemically reacting the hydrogen with an oxidant (e.g., oxidizing gas).

The fuel for generating electricity in the fuel cell system 100 includes hydrogen generated by reforming the fuel in addition to a liquid or gas fuel containing hydrogen such as methanol, ethanol, or natural gas. For convenience purposes, the liquid fuel is exemplified in the following description.

As for the oxidant (or oxidizing gas) reacting with hydrogen, the fuel cell system 100 may use oxygen stored in an additional storage element, or may use air containing oxygen. Hereinafter, the latter is exemplified in the following description.

The fuel cell system 100 includes: a stack 10 for generating electric energy through an electrochemical reaction of hydrogen and oxygen; a fuel supply unit 30 for generating hydrogen (or hydrogen-rich gas) from the fuel and for supplying the hydrogen to the stack 10; and an oxygen supply unit 40 for supplying the air to the stack 10.

The fuel cell system may use a direct oxidation fuel cell such as a direct methanol fuel cell (DMFC) which can produce electricity by directly supplying the fuel to the stack 10 without needing a reformer. As such, the DMFC does not include a reformer (e.g., a reformer 35) that is included in the aforementioned PEMFC.

Now, the fuel cell system 100 implemented as the PEMFC system will be described in more detail. However, the present invention is not limited thereto.

The stack 10 constitutes a fuel cell, which is connected to the fuel supply unit 30 and the oxygen supply unit 40, and to which hydrogen is supplied from the fuel supply unit 30 and air is supplied from the oxygen supply unit 40 so that electric energy is generated through the electrochemical reaction of hydrogen and oxygen in the air.

The fuel supply unit 30 includes a fuel tank 31 which stores a fuel, a fuel pump 33 which discharges the fuel stored in the fuel tank 31, and a reformer 35 which generates hydrogen (or hydrogen-rich gas) by using a supply of the fuel received from the fuel tank 31 and supplies the hydrogen to the stack 10.

The oxygen supply unit 40 includes an air pump 41 which pumps air by using a specific pumping force and supplies the air to the stack 10.

In the fuel supply unit 30, the reformer 35 can be a reformer in which a reforming gas (or a hydrogen-rich gas) including hydrogen is generated from the fuel through a chemical catalyst reaction using thermal energy, and in which concentration of carbon monoxide included in the reforming gas is reduced.

In other words, the reformer 35 may generate the reforming gas from the fuel through a catalytic reaction using thermal energy from, e.g., a steam reforming reaction, a partial oxidation reaction, and/or an auto-thermal reaction. Furthermore, the reformer 35 may reduce the concentration of carbon monoxide contained in the reforming gas by using a catalytic reaction such as a water-gas shift reaction and a preferential oxidation reaction and/or a hydrogen purification reaction using a separating membrane.

Figure 2:
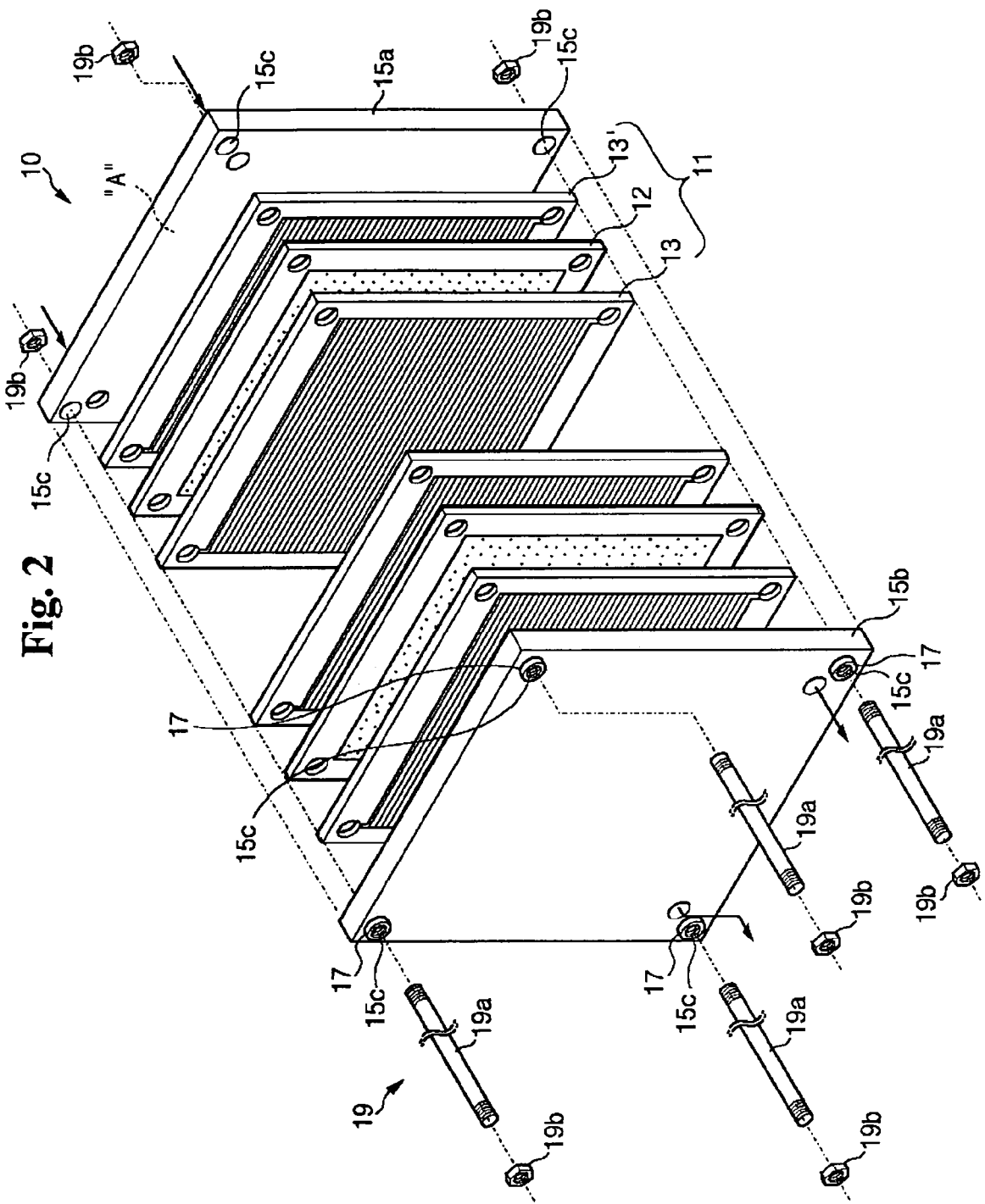
FIG. 2 is an exploded perspective view showing a stack according to an embodiment of the present invention.
Figure 3:
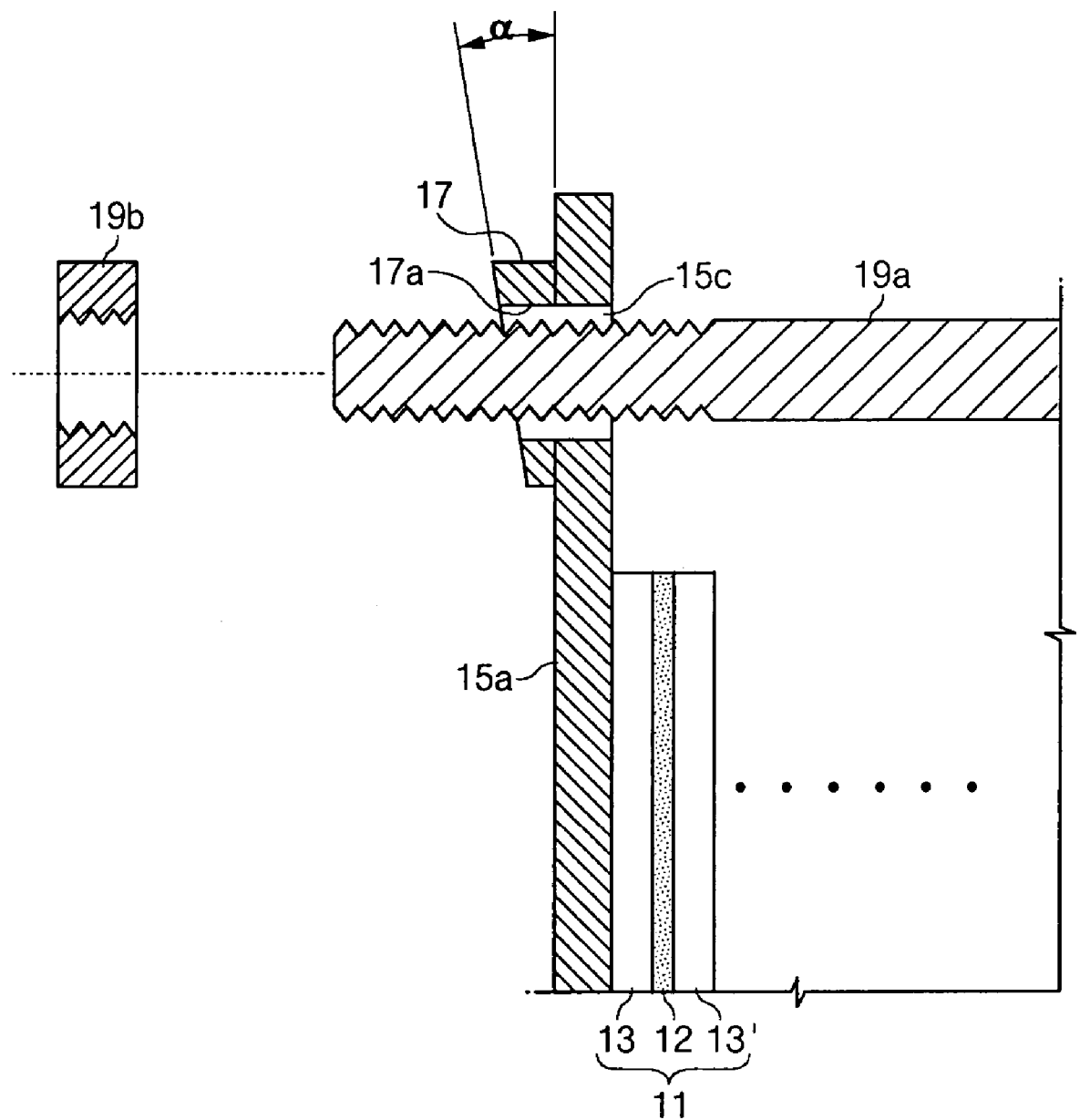
FIG. 3 is a schematic partial cross-sectional view showing a partial structure of a stack in an unassembled state according to an embodiment of the present invention.
Figure 4:
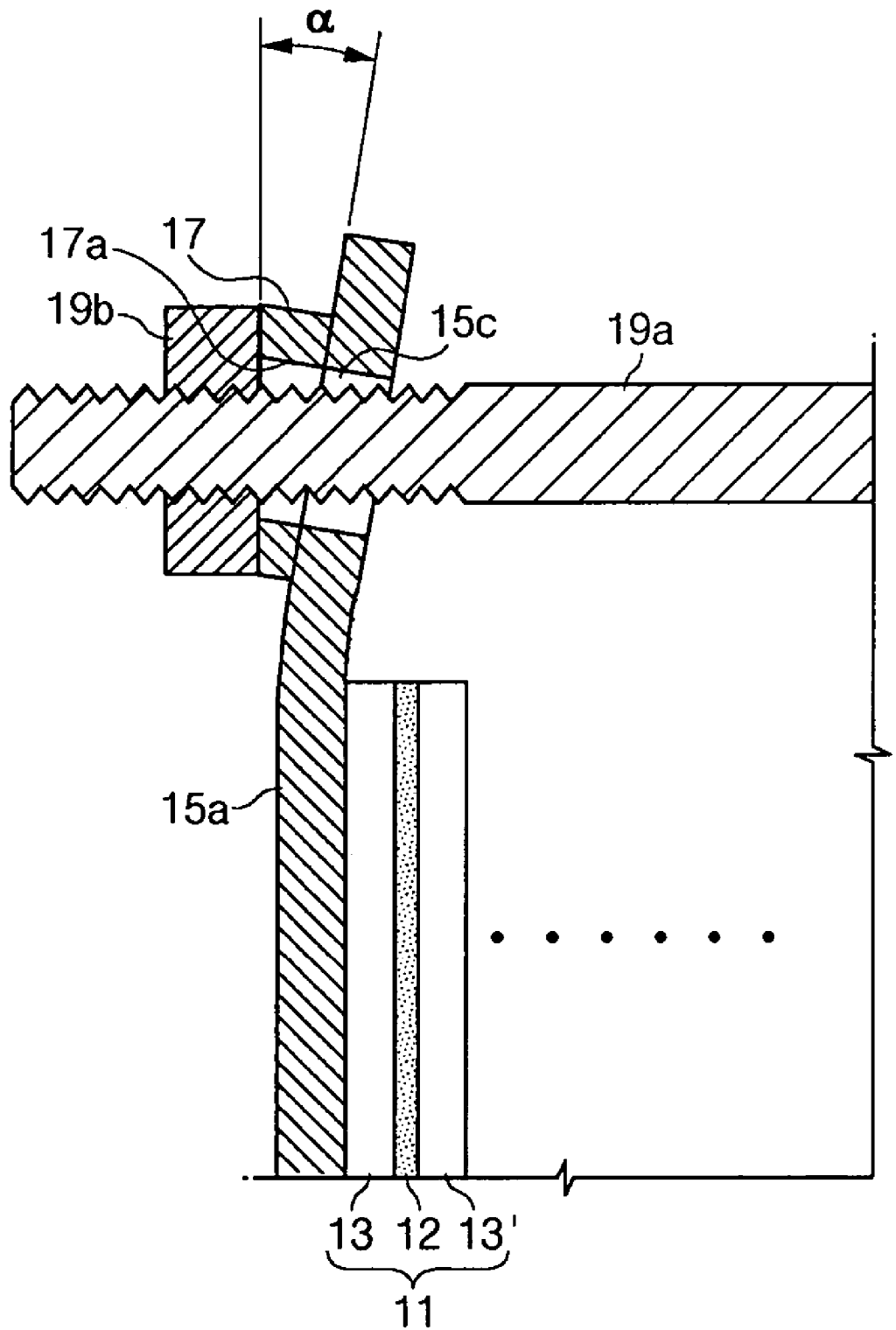
FIG. 4 is a schematic partial cross-sectional view showing a partial structure of a stack in an assembled state according to an embodiment of the present invention.

Referring to FIGS. 2 to 4, the stack 10 used in the fuel cell system 100 includes an electricity generating unit (or a unit cell) 11 which generates electricity and is constructed by closely disposing separators 13 and 13' (also referred to as "bipolar plate") on opposite surfaces of a membrane-electrode assembly (hereinafter, referred to as MEA) 12.

In the stack 10, a plurality of electricity generating units 11 are disposed in sequence (or are stacked adjacent to one another).

The MEA 12 includes an anode at one surface and a cathode at an opposite surface, and an electrolyte membrane is disposed therebetween.

The anode is supplied with the reforming gas through the separator 13. Furthermore, the anode includes a catalyst layer for separating the reforming gas into electrons and hydrogen ions, and a gas diffusion layer for smoothly moving the electrons and/or the reforming gas.

The cathode is supplied with the air through the separator 13'. Furthermore, the cathode includes a catalyst layer for generating water by reacting the electrons and the hydrogen ions supplied from the anode with oxygen in the air, and a gas diffusion layer for smoothly moving the oxygen.

The electrolyte membrane is made of a solid polymer electrolyte having a thickness ranging from 50 to 200 µm. The electrolyte membrane has an ion-exchange function for moving the hydrogen ions generated in the catalyst layer of the anode to the catalyst layer of the cathode.

The separators 13 and 13' are disposed with each other, and the MEA 12 is disposed therebetween (or is disposed to be in contact with the separators 13 and 13'). The separators 13 and 13' have a function for supplying the reforming gas supplied from the reformer 35 and the air supplied from the air pump 41 to the anode and cathode of the MEA 12, and also function as a conductor for serially connecting the anode and the cathode.

In the separator 13 or 13', a hydrogen path and/or an air path are formed on a contact surface which comes in contact with the MEA 12. Here, the hydrogen path is disposed at the anode of the MEA 12, and supplies the hydrogen-rich gas supplied from the reformer 35 to the anode. The air path is disposed at the cathode of the MEA 12, and supplies the oxygen in the air supplied from the air pump 41 to the cathode. In addition, as described above, the separator 13 or 13' has a function as a conductor for serially connecting the anode and the cathode.

End plates 15a and 15b are respectively disposed on the outermost surfaces of the stack 10 to fasten the electricity generating units 11. The end plates 15a and 15b may have not only a structure of a simple supporting body for fastening the electricity generating units 11 disposed adjacent to one another but also a structure of an electricity collecting unit for collecting electric energy generated from the electricity generating units 11.

Each of the end plates 15a and 15b is larger in size than each of the separators 13 and 13' of the electricity generating units 11 disposed between the end plates 15a and 15b.

When the end plates 15a and 15b come in contact with the separators 13 and 13' of the electricity generating units 11, edge portions of the end plates 15a and 15b are located outside of edge portions of the separators 13 and 13'.

Accordingly, the end plates 15a and 15b have a portion (indicated by A in FIG. 2) that does not overlap with (or is larger than) the separators 13 and 13' of the electricity generating units 11, and the end plates 15a and 15b are joined with each other by a restraint portion 19 disposed at the portion A to fasten the electricity generating units 11 together.

Here, the electricity generating units 11 are applied with a specific pressure from the end plates 15a and 15b to thereby form a cell assembly.

The restraint portion 19 includes a restraint rod 19a, which is disposed at (or inside) the portion A and is inserted into a restraint hole 15c formed at corners of the end plates 15a and 15b, and a nut 19b which is joined with a screw thread formed at opposite ends of the restraint rod 19a and fastens the restraint rod 19a to the end plates 15a and 15b.

The nut 19b provides a screw joint with the restraint rod 19a disposed in the end plates 15a and 15b so that the end plates 15a and 15b can fasten the electricity generating units 11. Here, the pressure applied to the electricity generating units 11 is controlled based on a squeezing (or pressing) force of the nut 19b.

An element 17 for reducing (or minimizing or preventing) stress concentration is provided near the restraint hole 15c at the outer surface of the end plates 15a and 15b and comes in contact with the nut 19b.

The element 17 for reducing (or minimizing or preventing) stress concentration has a hole 17a connected to the restraint hole 15c, and has a washer shape (see FIG. 3). As shown in FIG. 3, a surface of the element 17 that comes in contact with the nut 19b is inclined.

In one embodiment, an inclined surface (or an outer surface) of the element 17 for reducing (or minimizing or preventing) stress concentration is tilted with an inclination angle indicated by α in FIG. 3; that is, the thickness of the element 17 gradually increases along a direction pointing from inside of the end plates 15a and 15b to outside of the end plates 15a and 15b.

When the end plates 15a and 15b are squeezed by a pressure from the joining of the nut 19b with the restraint rod 19a, the inclination angle may be in the range in which the outer surface of the element 17 for reducing (or minimizing or preventing) stress concentration is perpendicular to the restraint rod 19a as shown in FIG. 4, while the end plates 15a and 15b are deformed due to the squeezing force of the nut 19b.

Although the element 17 for reducing (or minimizing or preventing) stress concentration is integrated into the end plates 15a and 15b in the form of protrusion at the outer surface of the end plates 15a and 15b in the present embodiment, the element 17 for reducing (or minimizing or preventing) stress concentration may be separated therefrom.

In one embodiment, the size of the element 17 for reducing (or minimizing or preventing) stress concentration corresponds to the size of the nut 19b so that the entire surface of the nut 19b can be covered. The thickness of the element 17 may be equal to or less than 2 mm.

When the nut 19b is joined with the restraint rod 19a, the element 17 for reducing (or minimizing or preventing) stress concentration comes in contact with the nut 19b. Thus, the squeezing force of the nut 19b is applied uniformly on the entire surface thereof.

When the nut 19b is joined with the restraint rod 19a with a torque (which may be predetermined), the inclination (or outer) surface of the element 17 for reducing (or minimizing or preventing) stress concentration becomes perpendicular with respect to the longitudinal direction of the restraint rod 19a.

The nut 19b can be joined with the restraint rod 19a while coming in contact with the element 17 for reducing (or minimizing or preventing) stress concentration in a manner such that the nut 19b comes in contact with the end plates 15a and 15b in a manner that reduces (or minimizes or prevents) a stress concentration.

As a result, in the end plates 15a and 15b, an excessive stress concentration can be reduced (minimized or prevented) at a portion where the restraint rod 19a and the nut 19b are joined with each other. Thus, the end plates 15a and 15b can be prevented from being excessively deformed due to a stress force.

Accordingly, in a stack for a fuel cell system of the present invention, a deformation of an element (e.g., an end plate) that occurs in an assembly process can be reduced (or minimized or prevented), and a pressure applied to the end plate with respect to electricity generating units can be uniformly maintained.

Therefore, the stack of the fuel system can maintain its shape in a satisfactory manner, and allows the stack to produce a sufficient power.

In an aforementioned embodiment, an element for reducing (or minimizing or preventing) stress concentration is additionally prepared and is then disposed between a nut and an end plate. However, an alternative embodiment of the present invention can be made without having to prepare an additional element for reducing (or minimizing or preventing) stress concentration because the element for minimizing (or reducing or preventing) stress concentration may be made instead by altering a construction of a conventional stack.

That is, unlike in a conventional stack in which an end plate has a flat shape, in an end plate according to an embodiment of the present invention, a portion proximate to where a restraint rod and a nut are joined with each other may be partially bent and molded, or may be curved (or generally curved) to thereby form an element for reducing (or minimizing or preventing) stress concentration.

Here, an inclination angle of an inclined surface of the element for reducing (or minimizing or preventing) stress concentration has to be taken into account when the end plate is partially bent or is curved (or generally curved).

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A stack for a fuel cell system comprising:
   an electricity generating unit including a membrane-electrode assembly (MEA) and a separator disposed on either surface of the MEA;
   an end plate at either side of the electricity generating unit, the end plate comprising an inner surface facing the electricity generating unit and an outer surface opposite the inner surface;
   a restraint portion joined with the end plate and fastening the end plate and the electricity generating unit together, wherein the restraint portion includes a restraint rod in the end plate and a nut screw-joined with the restraint rod for fastening the restraint rod to the end plate; and
   an element for reducing stress concentration coupled to the outer surface of the end plate to reduce a stress force generated by the nut from concentrating at a portion where the restraint portion is joined with the end plate,
   wherein a perimeter size of the end plate is larger than a perimeter size of the electricity generating unit, and the end plate comprises an inner portion having a size corresponding to the perimeter size of the electricity generating unit and an edge portion located outside of the inner portion, and
   wherein a portion of the edge portion proximate to where the restraint rod and the nut are screw-joined with each other is bent at an angle toward the electricity generating unit relative to the inner portion.

2. The stack of claim 1, wherein the element for reducing stress concentration is between the nut and the end plate, and wherein a contact surface of the element for reducing stress concentration contacting the nut is inclined with respect to the outer surface of the end plate at the portion of the edge portion proximate to where the restraint rod and the nut are screw-joined with each other.

3. The stack of claim 2, wherein a thickness of the element for reducing stress concentration increases toward a periphery of the end plate such that the contact surface of the element for reducing stress concentration contacting the nut is inclined toward the periphery of the end plate with respect to the outer surface of the end plate at the portion of the edge portion proximate to where the restraint rod and the nut are screw-joined with each other.

4. The stack of claim 2, wherein the element for reducing stress concentration has a washer shape.

5. The stack of claim 2, wherein the element for reducing stress concentration is integrated into the end plate.

6. The stack of claim 2, wherein the contact surface of the element for reducing stress concentration contacting the nut is perpendicular with respect to a longitudinal direction of the restraint rod.

7. The stack of claim 2, wherein the element for reducing stress concentration has a thickness of 2 mm or less.

8. The stack of claim 1, wherein the restraint rod is in an inserting hole at a corner of the end plate.

9. The stack of claim 1, wherein the element for reducing stress concentration is configured to cause the portion of the end plate proximate to where the restraint rod and the nut are screw-joined with each other to be bent toward the electricity generating unit.

10. The stack of claim 1, wherein a thickness of the element for reducing stress concentration increases toward a periphery of the end plate.

11. A stack for a fuel cell system comprising:
an electricity generating unit;
an end plate at either side of the electricity generating unit and having an inserting hole at a corner thereof, the end plate comprising an inner surface facing the electricity generating unit and an outer surface opposite the inner surface;
a restraint rod in the inserting hole;
a nut screw-joined with the restraint rod for fastening the restraint rod to the end plate; and
an element for reducing stress concentration coupled to the outer surface of the end plate to reduce a stress force generated by the nut from concentrating at a portion where the restraint rod is fastened to the end plate,
wherein a perimeter size of the end plate is larger than a perimeter size of the electricity generating unit, and the end plate comprises an inner portion having a size corresponding to the perimeter size of the electricity generating unit and an edge portion located outside of the inner portion, and
wherein a portion of the edge portion proximate to where the restraint rod and the nut are screw-joined with each other is bent at an angle toward the electricity generating unit relative to the inner portion.

12. The stack of claim 11, wherein the element for reducing stress concentration is between the nut and the end plate, and wherein a contact surface of the element for reducing stress concentration contacting the nut is inclined with respect to the outer surface of the end plate at the portion of the edge portion proximate to where the restraint rod and the nut are screw-joined with each other.

13. The stack of claim 12, wherein the contact surface of the element for reducing stress concentration contacting the nut is perpendicular with respect to a longitudinal direction of the restraint rod.

14. The stack of claim 11, wherein the element for reducing stress concentration is configured to cause the portion of the end plate proximate to where the restraint rod and the nut are screw-joined with each other to be bent toward the electricity generating unit.

15. The stack of claim 11, wherein a thickness of the element for reducing stress concentration increases toward a periphery of the end plate.

16. The stack of claim 1, wherein the element for reducing stress concentration has a size corresponding to a size of the nut.

* * * * *